United States Patent
Abinal et al.

(10) Patent No.: US 11,642,917 B2
(45) Date of Patent: May 9, 2023

(54) TIRE COMPRISING WORKING LAYERS HAVING AN IMPROVED ARCHITECTURE

(71) Applicant: COMPAGNIE GENERALE DES ETABLISSEMENTS MICHELIN, Clermont-Ferrand (FR)

(72) Inventors: Richard Abinal, Clermont-Ferrand (FR); Mathieu Albouy, Clermont-Ferrand (FR); François-Xavier Bruneau, Clermont-Ferrand (FR); Cyril Charreire, Clermont-Ferrand (FR); Pierre Fevrier, Clermont-Ferrand (FR); Patrick Pallot, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 727 days.

(21) Appl. No.: 16/343,603

(22) PCT Filed: Oct. 20, 2017

(86) PCT No.: PCT/FR2017/052885
§ 371 (c)(1),
(2) Date: Apr. 19, 2019

(87) PCT Pub. No.: WO2018/073546
PCT Pub. Date: Apr. 6, 2018

(65) Prior Publication Data
US 2020/0055344 A1 Feb. 20, 2020

(30) Foreign Application Priority Data

Oct. 21, 2016 (FR) .................... 1660243

(51) Int. Cl.
*B60C 9/18* (2006.01)
*B60C 9/30* (2006.01)
(Continued)

(52) U.S. Cl.
CPC .............. *B60C 9/30* (2013.01); *B60C 9/0042* (2013.01); *B60C 9/1807* (2013.01);
(Continued)

(58) Field of Classification Search
CPC ......... B60C 9/18; B60C 9/185; B60C 9/1835; B60C 9/24; B60C 2009/1871;
(Continued)

(56) References Cited

U.S. PATENT DOCUMENTS 3,599,696 A * 8/1971 Hartz .................... B60C 9/1821
152/153
2002/0088523 A1* 7/2002 Miyazaki .................. B60C 9/22
152/537

(Continued)

FOREIGN PATENT DOCUMENTS

EP 1 338 441 8/2003
FR 1 290 231 4/1962
(Continued)

OTHER PUBLICATIONS

English machine translation of JPS62-261505. (Year: 1987).*
English machine translation of JPH06-293026. (Year: 1994).*
English machine translation of JPH05319016. (Year: 1993).*

*Primary Examiner* — Robert C Dye
(74) *Attorney, Agent, or Firm* — Cozen O'Connor

(57) ABSTRACT

Tire comprising at least one working layer (41). The radially outermost one thereof comprises at least one undulation (412) radially on the outside of the points of the working layer (41) that are in line with the centre of the bottom face (243) of the major groove (24) closest to undulation (412).

(Continued)

The undulation (412) of the radially outermost working layer (41) is such that, over at least 10% of the radially outer surface (ROS) of the said working layer (41), the radial distance (do) between the radially outer surface (ROS) and the tread surface (21) is at least 1 mm less than the radial distance (dc) between the radially outer surface (ROS) and the tread surface (21), which is the distance in line with the centre of the bottom face (243) of the major groove (24) closest to the said undulation (412).

18 Claims, 2 Drawing Sheets

(51) Int. Cl.
    *B60C 9/00* (2006.01)
    *B60C 11/03* (2006.01)

(52) U.S. Cl.
    CPC .. *B60C 11/0304* (2013.01); *B60C 2009/1828* (2013.01); *B60C 2011/0353* (2013.01); *B60C 2011/0355* (2013.01); *B60C 2011/0383* (2013.01)

(58) Field of Classification Search
    CPC .... B60C 2009/1878; B60C 2009/2032; B60C 9/0292; B60C 9/28
    See application file for complete search history.

(56) References Cited

U.S. PATENT DOCUMENTS

| | | | |
|---|---|---|---|
| 2005/0230020 A1* | 10/2005 | Miyake | B60C 11/12 152/209.19 |
| 2009/0236022 A1* | 9/2009 | Matsuda | B60C 5/14 152/560 |
| 2013/0092304 A1* | 4/2013 | Murata | B60C 11/0306 152/209.9 |
| 2018/0207996 A1* | 7/2018 | Serva | B60C 11/04 |

FOREIGN PATENT DOCUMENTS

| | | |
|---|---|---|
| FR | 2 984 230 | 6/2013 |
| FR | 3 014 442 | 6/2015 |
| JP | S62-261505 | * 11/1987 |
| JP | S63 151503 | 6/1988 |
| JP | H05319016 | * 12/1993 |
| JP | H06-293026 | * 10/1994 |
| WO | WO 2012/069603 | 5/2012 |
| WO | WO 2013/053879 | 4/2013 |

* cited by examiner

TIRE COMPRISING WORKING LAYERS HAVING AN IMPROVED ARCHITECTURE

RELATED APPLICATIONS

This is a U.S. National Phase Application under 35 USC 371 of International Application PCT/FR2017/052885 filed on Oct. 20, 2017.

This application claims the priority of French application no. 1660243 filed Oct. 21, 2016, the entire content of which is hereby incorporated by reference.

FIELD OF THE INVENTION

The present invention relates to a tire intended to be fitted to a vehicle, and more particularly to the crown of such a tire.

BACKGROUND OF THE INVENTION

Since a tire has a geometry that exhibits symmetry of revolution about an axis of rotation, the geometry of the tire is generally described in a meridian plane containing the axis of rotation of the tire. For a given meridian plane, the radial, axial and circumferential directions denote the directions perpendicular to the axis of rotation of the tire, parallel to the axis of rotation of the tire and perpendicular to the meridian plane, respectively. The circumferential median plane referred to as the equatorial plane divides the tire into two substantially symmetrical half-torus shapes, it being possible for the tire to exhibit asymmetries of the tread, of architecture, which are connected with the manufacturing precision or with the sizing.

In the following text, the expressions "radially on the inside of" and "radially on the outside of" mean "closer to the axis of rotation of the tire, in the radial direction, than" and "further away from the axis of rotation of the tire, in the radial direction, than", respectively. The expressions "axially on the inside of" and "axially on the outside of" mean "closer to the equatorial plane, in the axial direction, than" and "further away from the equatorial plane, in the axial direction, than", respectively. A "radial distance" is a distance with respect to the axis of rotation of the tire and an "axial distance" is a distance with respect to the equatorial plane of the tire. A "radial thickness" is measured in the radial direction and an "axial width" is measured in the axial direction.

In what follows, the expression "in line with" means "for each meridian, radially on the inside within the boundaries of the axial coordinates delimited by". Thus, "the points of a working layer that are in line with a groove" refer, for each meridian, to the collection of points in the working layer that are radially on the inside of the groove within the boundaries of the axial coordinates delimited by the groove.

A tire comprises a crown comprising a tread that is intended to come into contact with the ground via a tread surface, two beads that are intended to come into contact with a rim, and two sidewalls that connect the crown to the beads. Furthermore, a tire comprises a carcass reinforcement, comprising at least one carcass layer, radially on the inside of the crown and connecting the two beads.

The tread of a tire is delimited, in the radial direction, by two circumferential surfaces of which the radially outermost is the tread surface and of which the radially innermost is referred to as the tread pattern bottom surface. The tread pattern bottom surface, or bottom surface, is defined as being the surface of the tread surface translated radially inwards by a radial distance equal to the tread pattern depth. It is commonplace for this depth to be degressive on the axially outermost circumferential portions, referred to as the shoulders, of the tread.

In addition, the tread of a tire is delimited, in the axial direction, by two lateral surfaces. The tread is also made up of one or more rubber compounds. The expression "rubber compound" refers to a composition of rubber comprising at least an elastomer and a filler.

The crown comprises at least one crown reinforcement radially on the inside of the tread. The crown reinforcement comprises at least one working reinforcement comprising at least one working layer made up of mutually parallel reinforcing elements that form, with the circumferential direction, an angle of between 15° and 50°. The crown reinforcement may also comprise a hoop reinforcement comprising at least one hooping layer made up of reinforcing elements that form, with the circumferential direction, an angle of between 0° and 10°, the hoop reinforcement usually, although not necessarily, being radially on the outside of the working layers.

For any layer of crown, working or other reinforcement reinforcing elements, a continuous surface, referred to as the radially outer surface (ROS) of the said layer, passes through the radially outermost point of each reinforcing element of each meridian. For any layer of crown, working or other reinforcement reinforcing elements, a continuous surface, referred to as the radially inner surface (RIS) of the said layer, passes through the radially innermost points of each reinforcing element of each meridian. The radial distances between a layer of reinforcing elements and any other point are measured from one or other of these surfaces and in such a way as to not incorporate the radial thickness of the said layer. If the other measurement point is radially on the outside of the layer of reinforcing elements, the radial distance is measured from the radially outer surface ROS to this point, and, respectively, from the radially inner surface RIS to the other measurement point if the latter is radially on the inside of the layer of reinforcing elements. This makes it possible to consider radial distances that are coherent from one meridian to the other, without the need to take into consideration possible local variations associated with the shapes of the sections of the reinforcing elements of the layers.

In order to obtain good grip on wet ground, cuts are made in the tread. A cut denotes either a well, or a groove, or a sipe, or a circumferential groove and forms a space opening onto the tread surface.

A sipe or a groove has, on the tread surface, two characteristic main dimensions: a width W and a length Lo, such that the length Lo is at least equal to twice the width W. A sipe or a groove is therefore delimited by at least two main lateral faces determining its length Lo and connected by a bottom face, the two main lateral faces being distant from one another by a non-zero distance referred to as the width W of the sipe or of the groove.

The depth of the cut is the maximum radial distance between the tread surface and the bottom of the cut. The maximum value for the depths of the cuts is referred to as the tread pattern depth D.

A tire needs to meet numerous performance criteria relating to phenomena such as wear, grip on various types of ground, rolling resistance and dynamic behaviour. These performance criteria sometimes lead to solutions that compromise other criteria. Thus, for good grip performance, the rubber material of the tread needs to be dissipative and soft. In contrast, in order to obtain a tire that performs well in terms of behaviour, notably in terms of dynamic response to transverse loading of the vehicle and therefore loading chiefly along the axis of the tire, the tire needs to have a sufficiently high level of stiffness, notably under transverse load. For a given size, the stiffness of the tire is dependent on the stiffness of the various elements of the tire that are the tread, the crown reinforcement, the sidewalls and the beads. The tread is traditionally stiffened either by stiffening the rubber materials, or by reducing the depth of the tread pattern or by reducing the groove-to-rubber ratio of the tread pattern.

In order to alleviate the problem, tire manufacturers have, for example, changed the rubber material by stiffening it notably using fibres, as mentioned in documents FR 3 014 442 and FR 2 984 230.

These solutions are not always satisfactory. Reducing the tread pattern depth limits the performance in terms of wear and in terms of wet grip. Stiffening the rubber material limits the wet and dry grip capabilities and also increases the tire noise during running. Reducing the void volume of the tread pattern reduces the wet grip capabilities particularly when there is a great depth of standing water. It is also important to maintain a certain thickness of rubber materials between the bottom face of the cuts, grooves or circumferential grooves and the reinforcing elements of the radially outermost crown reinforcement, in order to ensure the durability of the tire.

SUMMARY OF THE INVENTION

One object of the present invention is to increase the performance of the tire in terms of behaviour by improving its grip, and more particularly wet grip, and rolling-resistance performance without altering its wearing and crown-durability performance.

This and other objects are attained in accordance with one aspect of the invention directed to a tire comprising:
- a tread which is intended to come into contact with the ground via a tread surface comprising grooves,
- a groove forming a space opening onto the tread surface and being delimited by two main lateral faces connected by a bottom face,
- a groove having a width W defined by the mean distance between the two lateral faces and a depth D defined by the maximum radial distance between the tread surface and the bottom face,
- at least one groove, referred to as a major groove, having a width W at least equal to 1 mm and a depth D at least equal to 4 mm,
- the tire further comprising a crown reinforcement radially on the inside of the tread, and comprising a working reinforcement,
- the working reinforcement comprising at least one working layer,
- a working layer extending radially from a radially outer surface to a radially inner surface,
- a working layer comprising reinforcing elements at least partially made of metal coated in an elastomer material, which are continuous from one axially outer edge of the working layer to the opposite axially outer edge, mutually parallel and which with the circumferential direction of the tire form an oriented angle the absolute value of which is at least equal to 15° and at most equal to 50°,
- the radially outermost working layer comprising at least one undulation,
- the at least one undulation in the radially outermost working layer being such that, over at least 10% of the radially outer surface of the said working layer, the radial distance, between the radially outer surface of the radially outermost working layer and the tread surface, is at least 1 mm less than the radial distance between the radially outer surface of the radially outermost working layer and the tread surface, which is the distance in line with the centre of the bottom face of the major groove closest to the said undulation,
- the at least one undulation in the radially outermost working layer is such that the working layer portion of the undulation is radially on the outside of the points of the working layer that are in line with the centre of the bottom face of the major groove closest to the said undulation,
- the minimum radial distance between the radially outer surface of the radially outermost layer of the crown reinforcement and the tread surface is at most equal to the depth D of the closest major groove, increased by 2 mm.

In order to improve the dynamic response under transverse load, the tire therefore needs to be stiffened in its axial component which, in the case of the crown reinforcement, is essentially given by the stiffness of the metallic working layers and the distance between these and the tread surface. Specifically, the metallic working layers are rigid in tension and in compression because of their materials. They are also rigid in shear because of the angles they make with the circumferential direction and because they are coupled with only a thin thickness of rubber materials between them.

By contrast, the materials between the working layers and the tread surface work in shear under transverse load. The greater the radial thickness of these materials, the less stiff this part of the crown is, and the greater the extent to which the dynamic response performance under axial load is diminished. Therefore it is necessary to reduce this distance. However, it is necessary to maintain the tread pattern depth D in order to preserve the wearing and wet grip performance of the tire.

Moreover, it is necessary to preserve the radial distance d1, referred to as the beneath-void depth, between the radially outer surface (ROS) of the radially outermost working layer and the bottom face of the major grooves, in order to protect the reinforcing elements of the various working layers from puncturing. One solution to this problem is to leave unchanged the tread pattern depth D and the beneath-void depth d1 which are measured in line with the major grooves, and to reduce the radial distance do between the working layers and the tread surface in line with those tread portions that are devoid of major grooves.

Bearing in mind the fact that the tread surface of a tire is substantially cylindrical, this solution amounts to undulating the working layers radially according to undulations which may or may not be identical for every meridian plane, depending on the tread pattern and the choice of the designer. This solution goes against methods of tire manufacture for which the working layers are laid on substantially cylindrical forms, the working layers exhibiting in the meridian plane, for the tires of the prior art, a curvature that is even, without a point of inflection. Thus, the crown is made up, according to the prior art, of stacks of layers of material that are substantially parallel. It is common practice to very locally uncouple certain layers at the ends of the reinforcing elements that form them. These layers are arranged at a substantially constant radius. According to the invention, these layers are arranged with variations in radius over a minimal surface area in order to provide the expected advantages and exhibit at least one point of inflection in the meridian plane.

Motorcycle tires are not generally arranged at a substantially constant radius. However, for these tires, the layers of material of the crown are arranged along a convex, continuous curve. The invention could also apply to these tires, the undulations creating zones of greater concavity and exhibiting convexity about the continuous curve of the tire according to the prior art.

Moreover, undulating the layers of reinforcing elements may appear to make the tire more sensitive to variations in the geometry of the tread surface, impairing performance aspects such as uneven wear resistance, out-of-balance, etc. Nevertheless, the solution yields very good performance against these criteria.

In addition, undulating the layers of reinforcing elements subjected to compressive loadings goes against the recommendations for combating the buckling of the structures. Specifically, creating a discontinuity in a radius of curvature amounts to the creation of additional stresses where buckling may occur. However, in the tire, the loadings are very highly localized, which means that part of the crown is in tension when another part is in compression, on a scale that is very much smaller than that of the undulations. Thus, the undulations made within the limits of the invention do not detract from the durability of the tire.

In order to avoid any problem of crown durability associated with impacts as the tire runs along a road surface exhibiting an obstacle, or associated with the fatigue of the rubber material at the end of the reinforcing elements, it is important that the reinforcing elements of the working layer be continuous from one axially outer edge of the working layer to the opposite axially outer edge. The reinforcing elements of the working layer comprise one or more braided or unbraided metallic threads. It is important that these threads be very predominantly continuous across the entire width of the working layer so that the working layer is itself continuous.

Experience shows that in order to improve the performance in terms of dynamic behaviour under transverse load, one of the criteria which is sufficient in itself is to decrease the distance (do) between the radially outermost working layer and the tread surface. This makes it possible to reduce the sheared thicknesses of rubber materials of the tread and to reduce the production of heat caused by the hysteresis of these materials. These effects are beneficial both with regard to the stiffness of the tread, which is dependent on temperature, and with regard to the rolling resistance and durability performance aspects. Undulating the working layer additionally makes it possible to increase the axial stiffness of the tires by increasing the flexural inertia on the edge of the crown, something which leads to an appreciable improvement in behavioural performance. Moreover, in certain tires, the crown comprises just one working layer, and the invention also works in such cases.

This distance (do) is decreased by creating at least one undulation in the working layer, such that this undulation or undulated part of the working layer is radially on the outside of the part of the working layer that is in line with the major groove closest to the said undulation. It is not a matter of considering as being undulated a working layer that is not undulated but that meets the criterion for reducing the distance (do) by decreasing the tread pattern depth in a given zone. This feature is moreover known notably for tires for passenger vehicles the tread pattern depth of which is smaller on the axially outer edges, known as shoulders, of the tire than in the closest major grooves. In tires according to the prior art, in the part at the shoulders where the radial distance (do) diminishes, the working layer is either at the same radius, or radially on the inside of those parts of the same working layer that are in line with the closest major groove.

The invention also works if one or more undulations are positioned in one or more of the parts of one or more shoulders of the tire.

The beneath-void distance (d1) needs to be maintained in the major grooves. The minor grooves or the sipes are less sensitive to puncturing and to attack from obstacles because they are protected by the rubber material that technically characterizes them as being shallow or narrow grooves.

The layers with a low stiffness, by comparison with the working layers, such as the protective layers, which may or may not be metallic, the hooping layers, containing reinforcing elements that, with the circumferential direction (XX') of the tire, make an angle B at most equal, in terms of absolute value, to 10°, do not have sufficiently high compression stiffness or shear stiffness, because of their materials, which are sometimes textile, and because of the angles at which they are laid, for undulating these layers alone to afford to the problem a solution that has the same level of effectiveness as does the invention. These protective or hooping layers are optional in a tire and do not govern the benefit of the solution.

It would appear that undulating the radially outer surface of the working layer by 10% is enough to register an improvement in dynamic performance under transverse load. The amplitude of this undulation needs to be at least equal to 1 mm in order to have significant effects at tire level. Thus, the radial distance between the radially outer surface of the radially outermost working layer and the tread surface is at least 1 mm less than the radial distance between the radially outer surface of the radially outermost working layer and the tread surface, which is the distance in line with the centre of the bottom face of the major groove closest to the said undulation.

The optimum solution takes into account the characteristics of the tire and possibly of the vehicle. Optimization may be carried out depending on the directional nature of the tire, on the asymmetry thereof, and on the camber angle of the vehicle.

For preference, over at least 10%, preferably at least 20% and at most 85%, of the radially outer surface (ROS) of the radially outermost working layer, the radial distance (do) between the radially outer surface (ROS) of the radially outermost working layer and the tread surface is at least 1.5 mm, and preferably 2 mm, less than the radial distance (dc) between the radially outer surface (ROS) of the radially outermost working layer and the tread surface, which is the distance in line with the centre of the bottom face of the major groove closest to the said undulation. The design parameters that make it possible to regulate the dynamic response under significant transverse load, representing at least of the order of 50% of the nominal tire load, are:

The extent of the undulations of the radially outermost working layer, in the knowledge that the void ratio of the tread pattern, which is rarely less than 15%, limits it to at most 85% (100%-15%). The more extensive the undulation, the stiffer the tire under transverse load, and the better its rolling resistance performance.

The amplitude of the undulation is at least equal to 1 mm, but limited to 5 mm because of the radii of curvature that have to be imparted to the metallic working layers which are stiff and therefore not very deformable.

One preferred solution is therefore that, over at least 10%, preferably at least 20% and at most 85%, of the radially outer surface (ROS) of the radially outermost working layer, the radial distance (do) between the radially outer surface (ROS) of the radially outermost working layer and the tread surface is at most 5 mm, and preferably at most 3 mm, less than the radial distance (dc) between the radially outer surface (ROS) of the radially outermost working layer and the tread surface, which is the distance in line with the centre of the bottom face of the major groove closest to the said undulation.

For optimum performance in terms of puncturing and attack of the crown, without penalizing the rolling resistance, the radial distance (d1) between the radially outer surface (ROS) of the radially outermost working layer and the bottom face of the major grooves is at least equal to 1 mm and at most equal to 5 mm, preferably at least equal to 2 mm and at most equal to 4 mm. Below the lower limits, the tire may prove too sensitive to attack. Above the upper limits, the rolling resistance of the tire would be penalized.

It is advantageous for the tread, for example a major groove of the tread, to comprise at least one wear indicator, and for the minimum radial distance (du) between the radially outer surface (ROS) of the radially outermost layer of the crown reinforcement and the tread surface to be at least equal to the radial distance (df) between the tread surface and the radially outermost point of the wear indicator. Specifically, it is important for the user to be able to perceive that the tire is worn, using the wear indicator, and to be able to do so before the reinforcing elements of the radially outermost layer of the crown reinforcement begin to appear on the tread surface.

Advantageously, the minimum radial distance (du) between the radially outer surface (ROS) of the radially outermost layer of the crown reinforcement and the tread surface is at most equal to the depth D of the closest major groove, increased by 2 mm, and at least equal to the depth D of the closest major groove, decreased by 2 mm. This solution allows ideal positioning of the radially outermost layer of reinforcing elements of the crown reinforcement, and the tread surface. The minimum radial distance (du) between the radially outer surface (ROS) of the radially outermost layer of the crown reinforcement and the tread surface has to be measured over the radially outer portion of the crown reinforcement, and therefore at an undulation.

For preference, the depth D of a major groove is at least equal to 6 mm and at most equal to 20 mm. Tread pattern depths of between 6 and 10 mm allow a good compromise between wearing and rolling resistance performance aspects in many passenger vehicle tires. Tread pattern depths of between 10 and 20 mm are attractive for the same compromises in tires for vehicles that carry heavy loads. The invention is not restricted to tires for a particular use.

In instances in which the radially outermost layer of reinforcing elements is a hooping layer, it is advantageous for the radially outermost layer of reinforcing elements in the crown reinforcement to comprise reinforcing elements made of textile, preferably of the aliphatic polyamide, aromatic polyamide type, of a type involving a combination of aliphatic polyamide and aromatic polyamide, of polyethylene terephthalate or of rayon type, which are mutually parallel and form, with the circumferential direction (XX') of the tire, an angle B at most equal to 10°, in terms of absolute value, One preferred solution is for at least one element of padding rubber, having a radial thickness at least equal to 0.3 mm, to be positioned in line with any undulation of the radially outermost working layer. The purpose of this is to allow the plies to undulate during building and curing. These elements of padding rubber may be present around the entire circumference of the tire or be arranged in certain portions of the tire as required. It is possible to lay several elements of padding rubber in line with the one or more undulations with different radius values having different properties dependent on the tire loading specification sheet. If a single element of padding rubber is laid, its maximum thickness is approximately equal, for a given undulation, to the radial distance between the radially outermost point of the radially outer surface of the radially outermost working layer at the undulation and the radially outer surface of the radially outermost working layer in line with the centre of the bottom face of the major groove closest to the said undulation.

With the tread being made up of a rubber compound, it is advantageous for the element of padding rubber, laid in line with the undulation or undulations, to be a rubber compound that has a dynamic loss tan $\delta 1$, measured at a temperature of 10° C. and under a stress of 0.7 MPa at 10 Hz, at most equal to and preferably 30% less than the dynamic loss tan $\delta 2$ of the rubber material of which the tread is made, measured at a temperature of 10° C. and under a stress of 0.7 MPa at 10 Hz. For a padding material with the same hysteresis, the improvement in terms of rolling resistance is achieved only by the reduction in the shear stress loadings that this material experiences. Because the padding material does not experience the same stresses as the rubber material of which the tread is made, it is possible to modify its characteristics in order to improve the rolling resistance still further. A 30% drop in hysteresis leads to a significantly higher improvement for the invention.

It is preferable for the crown reinforcement to consist of 2 working plies of opposite angles and one hooping ply, as in numerous present-day crown architectures.

BRIEF DESCRIPTION OF THE DRAWINGS

The features and other advantages of the invention will be understood better with the aid of FIGS. 1 to 3, the said figures being drawn not to scale but in a simplified manner so as to make it easier to understand the invention.

DETAILED DESCRIPTION OF THE DRAWINGS

Figure 1:
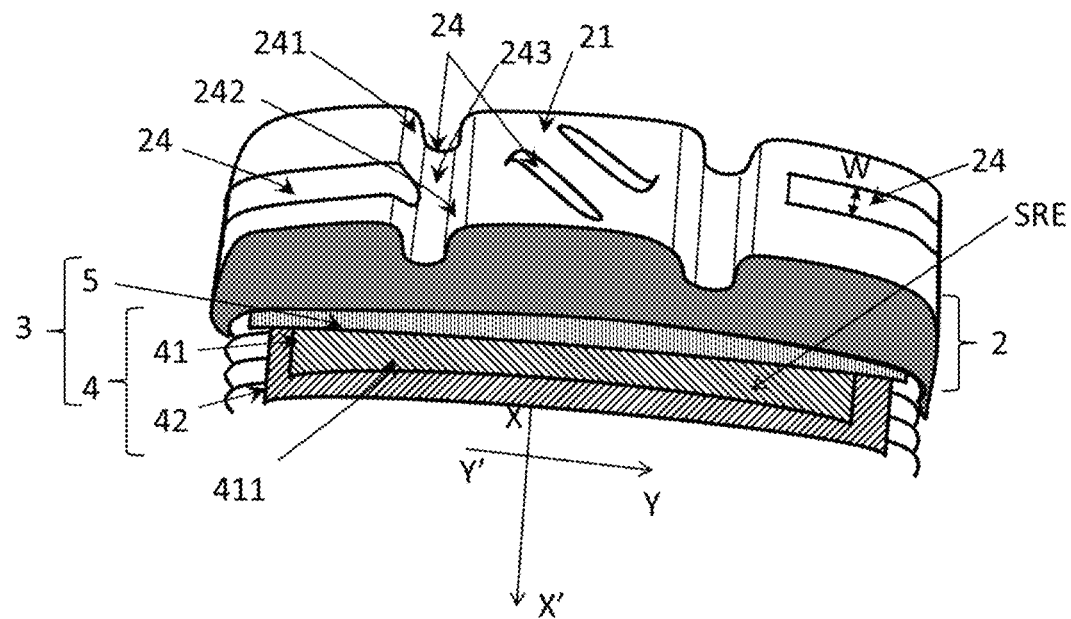
FIG. 1 is part of a tire, particularly the architecture and the tread thereof.

FIG. 1 depicts a perspective view of a part of the crown of a tire. A cartesian frame of reference (XX', YY', ZZ') is associated with each meridian plane. The tire comprises a tread 2 which is intended to come into contact with the ground via a tread surface 21. Arranged in the tread are grooves 24 of width W possibly differing from one groove to another, each having main profiles 241 and 242 and a bottom face 243. The tire further comprises a crown reinforcement 3 comprising a working reinforcement 4 and here, by way of example, a hoop reinforcement 5. The working reinforcement comprises at least one working layer and here, for example, two working layers 41 and 42 each comprising mutually parallel reinforcing elements. The radially outer surface (ROS) of the radially outermost working layer (41) is also depicted.

Figure 2:
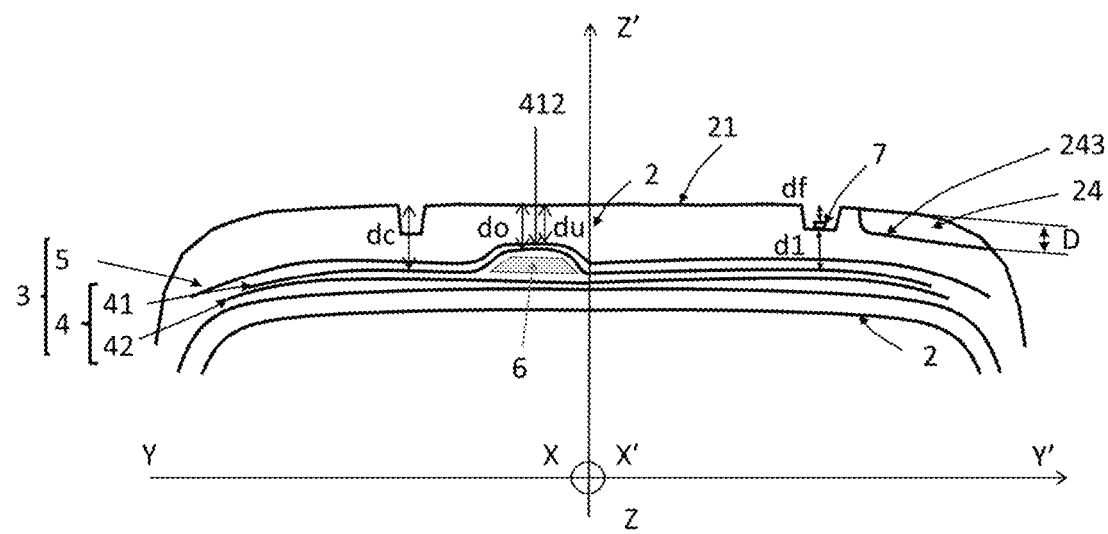
FIG. 2 depicts a meridian section through the crown of a tire according to the invention and illustrates the various radial distances du, do, d1, D, df, dc and an element of padding rubber capable of creating an undulation in the radially outermost working layer.

FIG. 2 depicts a schematic meridian section through the crown of the tire according to the invention. It illustrates in particular an undulation of the radially outermost working layer (41) and an element of padding rubber (6) positioned in line therewith. FIG. 2 also illustrates the following radial distances:

- D: the depth of a groove, which is the maximum radial distance between the tread surface (21) and the bottom face (243) of the groove,
- dc: the radial distance between the radially outer surface (ROS) of the radially outermost working layer (41) and the tread surface (21), which is the distance in line with the centre of the bottom face (243) of the major groove (24) closest to the said undulation (412),
- do: the radial distance between the radially outer surface (ROS) of the radially outermost working layer (41) and the tread surface at the undulation (412),
- du: the minimum radial distance (du) between the radially outer surface (ROS) of the radially outermost layer of the crown reinforcement (3) and the tread surface (21),
- df: the radial distance between the tread surface (21) and the radially outermost point of the wear indicator (7),
- d1: the distance between the radially outer surface (ROS) of the radially outermost working layer (41) and the bottom face (243) of the major grooves (24).

A meridian section through the tire is obtained by cutting the tire on two meridian planes. This section is used to determine the various radial distances, the centre of the bottom faces of the grooves and of the circumferential grooves.

Figure 3:
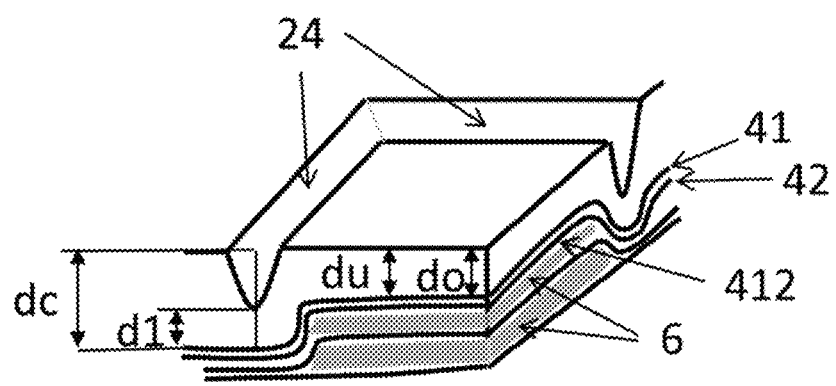
FIG. 3 depicts a portion of the tread surface delimited circumferentially and axially by major grooves (24) that also delimit an undulation (412) of the radially outermost working layer (41) for a tire having only two working layers (41, 42). It illustrates the possibility of arranging, in line with the undulation (412), several elements of padding rubber (6), the materials of which may have different properties depending on the specific needs associated with the respective radial, axial and circumferential positions thereof.

FIG. 3 depicts an undulation 412 of the radially outermost working layer 41 of a crown devoid of a hooping layer or protective layer such that, here, do is equal to du. The undulations are limited axially and circumferentially to one tread pattern element. These elements may repeat in the tread pattern of the tire with or without undulations of the radially outermost working layer in line therewith. The sum of the surface areas of the undulations should at least represent 10% of the total surface area of the radially outermost working layer in order for the effect to be advantageous. FIG. 3 also shows how it is possible to obtain an undulation by laying several elements of padding rubber 6 between different layers of reinforcing elements of the crown reinforcement, in order, for example, to limit the radii of curvature of the reinforcing elements of the different layers.

The invention was carried out on a tire A of size 305/30 ZR20 intended to be fitted to a passenger vehicle. The depths D of the grooves of the tread pattern are comprised between 4 and 7 mm for widths W varying between 4 and 15 mm. The crown reinforcement is made up of two working layers the reinforcing elements of which make an angle of + or −38° with the circumferential direction and of a hooping layer the reinforcing elements of which make an angle of + or −3° with the circumferential direction. The reinforcing elements of the working layer are continuous metallic cords. The radially outermost working layer is undulated over 50% of its radially outer surface. The undulations have radial distances do between the radially outer surface (ROS) of the radially outermost working layer (41) and the tread surface at the undulations (412) that are greater by 1 mm than the radial distances (dc) between the radially outer surface (ROS) of the radially outermost working layer (41) and the tread surface (21), which are the distances in line with the centre of the bottom face of the major grooves (24) closest to the said undulations (412). Over 20% of its radially outer surface, the radial distances do are 2 mm greater than or equal to the radial distances (dc). The radial distance (d1) between the radially outer surface (ROS) of the radially outermost working layer (41) and the bottom face (243) of the major grooves (24) is comprised between 2 mm and 3.5 mm.

Tires A were compared with tires B of the same size, having the same characteristics except that the working layers were not undulated.

The padding compound used to create the undulations has a dynamic loss tan δ1, measured at a temperature of 10° C. and under a stress of 0.7 MPa at 10 Hz, 60% less than that of the rubber material of which the tread is made.

The improvement in terms of rolling resistance of the invention was evaluated on a standard machine for measurements standardized in accordance with ISO 2850:2009. The tests reveal a more than 5% improvement by comparison with the reference tire B.

Furthermore, a measurement of the characteristic Dz of the Pacejka tire behaviour model well known to those skilled in the art reveals a 15% improvement in this characteristic for a pressure of 3.6 b, hot. The improvement in dry grip varies between 1 and 5% depending on the stress loading conditions.

The tires were also fitted to a sports-type vehicle and tested on a winding circuit capable of generating significant transverse loadings. A professional driver, trained in assessing tires, compares tires A according to the invention with tires B according to the prior art and according to a rigourous testing process, under the same temperature conditions and ground running conditions, without knowing the features of the tires being tested, repeating the measurement. The driver assigns scores to the tires. In all the tests performed, tires A according to the invention outclass tires B in terms of vehicle behaviour, roadholding, on dry ground and in terms of grip. Furthermore, the behavioural performance is more constant during a behaviour test on a vehicle fitted with a tire according to the invention than with a tire according to the prior art.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A tire, comprising:
    a tread which is adapted to come into contact with the ground via a tread surface comprising grooves;
    each groove forming a space opening onto the tread surface and being delimited by two main lateral faces connected by a bottom face;
    each groove having a width W defined by the mean distance between the two lateral faces and a depth D defined by the maximum radial distance between the tread surface and the bottom face;

at least one said groove, referred to as a major groove, having a width W at least equal to 1 mm and a depth D between 4 mm and 7 mm;

the tire further comprising a crown reinforcement radially on the inside of the tread, and comprising a working reinforcement and a hoop reinforcement;

the working reinforcement comprising at least one working layer;

the at least one working layer extending radially from a radially inner surface to a radially outer surface; and the at least one working layer comprising reinforcing elements which are continuous from one axially outer edge of the working layer to the opposite axially outer edge, at least partially made of metal coated in an elastomer material, mutually parallel and which with the circumferential direction of the tire form an oriented angle the absolute value of which is at least equal to 15° and at most equal to 50°;

the hoop reinforcement comprising at least one hooping layer, the at least one hooping layer comprising reinforcing elements which are continuous from one axially outer edge of the radially outermost working layer to the opposite axially outer edge of the radially outermost working layer, wherein the radially outermost working layer comprises at least one undulation, wherein the at least one undulation in the radially outermost working layer is arranged such that the working layer portion of the undulation is radially on the outside of the points of the working layer that are in line with the centre of the bottom face of a major groove closest to said undulation, wherein the at least one undulation in the radially outermost working layer is such that, over at least 10% of the radially outer surface of said working layer, the radial distance, between the radially outer surface of the radially outermost working layer and the tread surface, is at least 1 mm less than the radial distance between the radially outer surface of the radially outermost working layer and the tread surface, which is the distance in line with the centre of the bottom face of the major groove closest to said undulation, wherein the at least one undulation is arranged axially between the major groove closest to said undulation and a centerline of the tread, wherein the at least one undulation comprises a first portion that extends radially towards the tread surface and a second portion that extends radially away from the tread surface, and wherein the minimum radial distance between the radially outer surface of the radially outermost layer of the crown reinforcement and the tread surface is at most equal to the depth D of the closest major groove, increased by 2 mm.

2. The tire according to claim 1, wherein, over at least 10% of the radially outer surface of the radially outermost working layer, the radial distance between the radially outer surface of the radially outermost working layer and the tread surface is at least 1.5 mm less than the radial distance between the radially outer surface of the radially outermost working layer and the tread surface, which is the distance in line with the centre of the bottom face of the major groove closest to said undulation.

3. The tire according to claim 1, wherein, over at least 10% of the radially outer surface of the radially outermost working layer, the radial distance between the radially outer surface of the radially outermost working layer and the tread surface is at most 5 mm less than the radial distance between the radially outer surface of the radially outermost working layer and the tread surface, which is the distance in line with the centre of the bottom face of the major groove closest to said undulation.

4. The tire according to claim 1, wherein the radial distance between the radially outer surface of the radially outermost working layer and the bottom face of the major groove is at least equal to 1 mm and at most equal to 5 mm.

5. The tire according to claim 1, where at least one major groove of the tread comprises at least one wear indicator, wherein the minimum radial distance between the radially outer surface of the radially outermost layer of the crown reinforcement and the tread surface is at least equal to the radial distance between the tread surface and the radially outermost point of the wear indicator.

6. The tire according to claim 1, wherein the minimum radial distance between the radially outer surface of the radially outermost layer of the crown reinforcement and the tread surface is at least equal to the depth D of the closest major groove, decreased by 2 mm.

7. The tire according to claim 1, wherein the radially outermost layer of reinforcing elements of the crown reinforcement comprises reinforcing elements made of textile of a type involving a combination of aliphatic polyamide and aromatic polyamide, of polyethylene terephthalate or of rayon type, which are mutually parallel and form, with the circumferential direction of the tire, an angle B at most equal to 10°, in terms of absolute value.

8. The tire according to claim 1, wherein at least one element of padding rubber, having a radial thickness at least equal to 0.3 mm, is positioned in line with the undulation of the radially outermost working layer.

9. The tire according to claim 8, the tread being comprised of a rubber compound, wherein the element of padding rubber is a rubber compound that has a dynamic loss tan δ1, measured at a temperature of 10° C. and under a stress of 0.7 MPa at 10 Hz, at most equal to the dynamic loss tan δ2 of the rubber material of which the tread is made, measured at a temperature of 10° C. and under a stress of 0.7 MPa at 10 Hz.

10. The tire according to claim 8, the tread being comprised of a rubber compound, wherein the element of padding rubber is a rubber compound that has a dynamic loss tan δ1, measured at a temperature of 10° C. and under a stress of 0.7 MPa at 10 Hz, at most 30% less than the dynamic loss tan δ2 of the rubber material of which the tread is made, measured at a temperature of 10° C. and under a stress of 0.7 MPa at 10 Hz.

11. The tire according to claim 1, wherein the crown reinforcement consists of 2 working plies of opposite angles and one hooping ply.

12. The tire according to claim 1, wherein, over at least 20% and at most 85%, of the radially outer surface of the radially outermost working layer, the radial distance between the radially outer surface of the radially outermost working layer and the tread surface is at least 2 mm less than the radial distance between the radially outer surface of the radially outermost working layer and the tread surface, which is the distance in line with the centre of the bottom face of the major groove closest to said undulation.

13. The tire according to claim 1, wherein, over at least 20% and at most 85%, of the radially outer surface of the radially outermost working layer, the radial distance between the radially outer surface of the radially outermost working layer and the tread surface is at most 3 mm less than the radial distance between the radially outer surface of the radially outermost working layer and the tread surface, which is the distance in line with the centre of the bottom face of the major groove closest to said undulation.

14. The tire according to claim 1, wherein the radial distance between the radially outer surface of the radially outermost working layer and the bottom face of the major groove is at least equal to 2 mm and at most equal to 4 mm.

15. The tire according to claim 1, wherein the radially outermost layer of reinforcing elements of the crown reinforcement comprises reinforcing elements made of textile, of aliphatic polyamide type, aromatic polyamide type, of a type involving a combination of aliphatic polyamide and aromatic polyamide, of polyethylene terephthalate or of rayon type, which are mutually parallel and form, with the circumferential direction of the tire, an angle B at most equal to 10°, in terms of absolute value.

16. The tire according to claim 1, wherein the hoop reinforcement further has at least one undulation in line with the at least one undulation of the radially outermost working layer.

17. The tire according to claim 1, wherein the at least one hooping layer comprises reinforcing elements which form an oriented angle with the circumferential direction of the tire the absolute value of which is at least equal to 0° and at most equal to 10°.

18. The tire according to claim 1, wherein the at least one hooping layer is the radially outermost layer of reinforcing elements of the crown reinforcement.

\* \* \* \* \*